United States Patent
Sholtis

(10) Patent No.: US 8,122,480 B2
(45) Date of Patent: Feb. 21, 2012

(54) METHOD AND APPARATUS FOR FACILITATING INTERACTIONS WITH AN OBJECT IN A DIGITAL VIDEO FEED TO ACCESS ASSOCIATED CONTENT

(75) Inventor: Steven A. Sholtis, El Dorado Hills, CA (US)

(73) Assignee: Intuit Inc., Mountain View, CA (US)

( * ) Notice: Subject to any disclaimer, the term of this patent is extended or adjusted under 35 U.S.C. 154(b) by 1636 days.

(21) Appl. No.: 11/448,488

(22) Filed: Jun. 6, 2006

(65) Prior Publication Data
US 2007/0300268 A1 Dec. 27, 2007

(51) Int. Cl.
| | |
|---|---|
| H04N 7/173 | (2011.01) |
| G06F 3/048 | (2006.01) |
| G06F 3/00 | (2006.01) |
| H04N 11/00 | (2006.01) |
| H04N 5/445 | (2011.01) |
| G06Q 40/00 | (2006.01) |

(52) U.S. Cl. ............ 725/113; 725/51; 725/60; 725/109; 725/110; 725/112; 714/774; 705/37; 348/468; 348/563

(58) Field of Classification Search ............. 725/113, 725/60, 109, 110, 112, 51; 715/774; 705/37; 348/468, 563
See application file for complete search history.

(56) References Cited

U.S. PATENT DOCUMENTS

| | | | | |
|---|---|---|---|---|
| 6,006,257 | A * | 12/1999 | Slezak | 725/110 |
| 6,144,375 | A * | 11/2000 | Jain et al. | 715/251 |
| 6,637,032 | B1 * | 10/2003 | Feinleib | 725/110 |
| 7,774,815 | B1 * | 8/2010 | Allen | 725/80 |
| 7,818,232 | B1 * | 10/2010 | Mead et al. | 705/36 R |
| 2006/0236258 | A1 * | 10/2006 | Othmer et al. | 715/774 |
| 2007/0240232 | A1 * | 10/2007 | Pino et al. | 726/28 |
| 2008/0141172 | A1 * | 6/2008 | Yamamoto et al. | 715/835 |
| 2010/0014833 | A1 * | 1/2010 | Pjanovic et al. | 386/95 |

* cited by examiner

*Primary Examiner* — Hoang-Vu A Nguyen-Ba
(74) *Attorney, Agent, or Firm* — Park, Vaughan, Fleming & Dowler LLP

(57) ABSTRACT

A system that facilitates interactions with a digital video feed. During operation, the system receives the digital video feed, which includes a corresponding content feed, wherein the corresponding content feed is synchronized with the digital video feed, and wherein the corresponding content feed contains information associated with moving objects within the digital video feed. Next, the system plays the digital video feed within a viewer and allows a user to select a moving object being displayed within the viewer. In response to the selection, the system obtains content associated with the moving object and displays the content to the user.

20 Claims, 2 Drawing Sheets

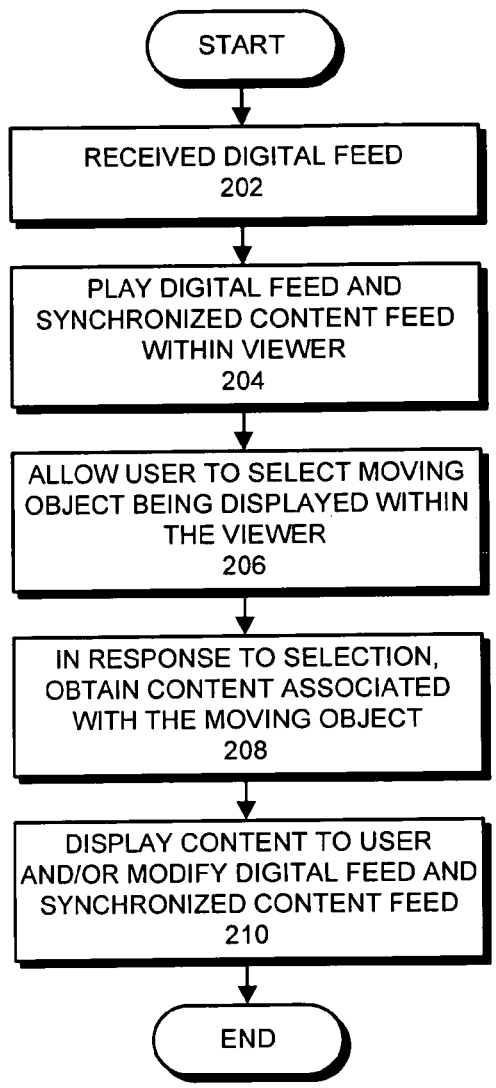
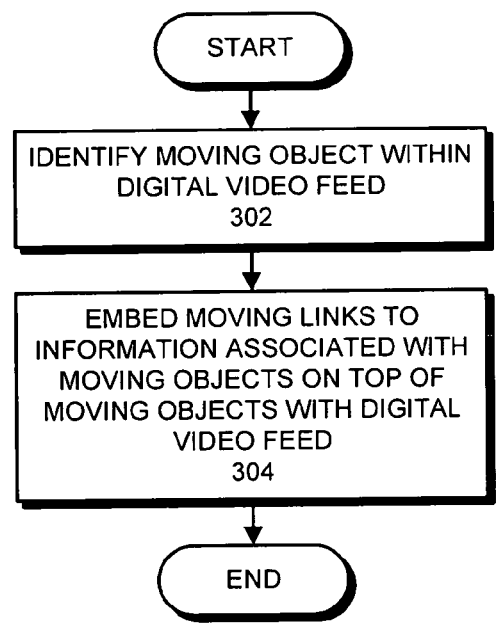
FIG. 2
FIG. 3

METHOD AND APPARATUS FOR FACILITATING INTERACTIONS WITH AN OBJECT IN A DIGITAL VIDEO FEED TO ACCESS ASSOCIATED CONTENT

BACKGROUND

Related Art

The present invention relates to techniques for delivering content to users across the Internet.

Advances in computer-networking technology have made Internet broadband connections more economical. As a result, more Internet users are moving to Internet broadband connections, and more service providers are moving their services to the Internet. For example, the Voice Over Internet Protocol (VOIP) is beginning to replace traditional circuit-switched phone lines for making telephone calls, and Internet Protocol Television (IPTV) is facilitating the delivery of digital television over the Internet.

Internet broadband connections presently make it possible to integrate digital video feeds into web applications and their associated user interfaces. This has led to a rapid proliferation in the use of applications that facilitate delivery of such video feeds. Unfortunately, unlike objects in conventional web-based interfaces, which can be selected and otherwise manipulated, there is presently no easy way to interact with moving objects within a digital video feed.

SUMMARY

One embodiment of the present invention provides a system that facilitates interactions with a digital video feed. During operation, the system receives the digital video feed, which includes a corresponding content feed, wherein the corresponding content feed is synchronized with the digital video feed, and wherein the corresponding content feed contains information associated with moving objects within the digital video feed. Next, the system plays the digital video feed within a viewer and allows a user to select a moving object being displayed within the viewer. In response to the selection, the system obtains content associated with the moving object and displays the content to the user.

In a variation on this embodiment, prior to receiving the digital video feed, the system creates the digital video feed by identifying moving objects within the digital video feed, and embedding moving links to information associated with the moving objects on top of the moving objects within the digital video feed.

In a further variation, after the digital video feed is created, the system sends the digital video feed, including the corresponding content feed, from a server to a client.

In a variation on this embodiment, the digital video feed is an Internet Protocol Television (IPTV) video feed.

In a variation on this embodiment, the moving object is a moving symbol for a tradable security within the digital video feed.

In a further variation, if the moving symbol is selected by the user, the system causes a webpage for an investment broker to be displayed along with information about the tradable security to enable the user to trade the tradable security.

In a further variation, the tradable security is a stock and the moving symbol is a moving stock ticker symbol.

In a variation on this embodiment, in response to the selection, the system modifies the digital video feed and the corresponding content feed.

One embodiment of the present invention provides a system that contains video data which is structured to facilitate interactions between a user and moving objects in a digital video feed. The video data includes: (1) a digital-video component which is configured to be transmitted as the digital video feed, and (2) a content component which is configured to be transmitted as a corresponding content feed. The video data is structured so that the digital-video feed is synchronized with the corresponding content feed when the digital-video feed and the corresponding content feed are transmitted, wherein the corresponding content feed contains content information associated with a moving object within the digital video feed. The content information for the moving object is structured to be retrieved in response to a user selection of the moving object in the digital video feed.

BRIEF DESCRIPTION OF THE FIGURES

FIG. 2 presents a flow chart illustrating the process of interacting with a digital video feed in accordance with an embodiment of the present invention.

FIG. 3 presents a flow chart illustrating the process of creating an interactive digital video feed in accordance with an embodiment of the present invention.

DETAILED DESCRIPTION

Figure 1:
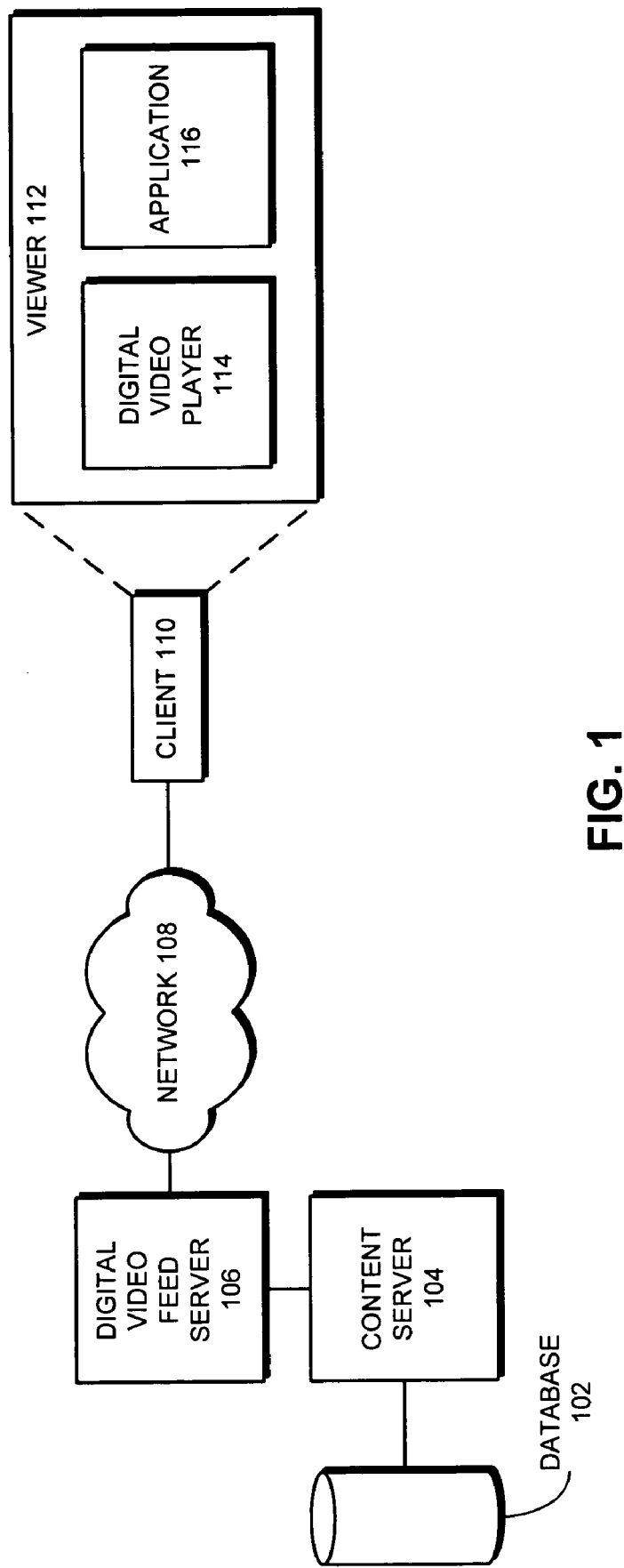
FIG. 1 presents a block diagram of a digital video feed server and a viewer used to play the digital video feed in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), or other storage media now known or later developed.

System

FIG. 1 presents a block diagram of digital video feed server 106 and viewer 112, which is used to play a digital video feed in accordance with an embodiment of the present invention. Digital video feed server 106 is coupled to client 10 through network 108. Digital video feed server is also coupled with content server 104, which provides a content feed that is synchronized with the digital video feed. Note that the content feed contains information associated with moving objects within the digital video feed. In one embodiment of the present invention, the information associated with moving objects is stored within database 102, which is coupled to content server 104. In other embodiments, the information associated with moving objects can be stored within other data structures including but not limited to: flat files, comma separated values, lists, arrays, trees, and heaps.

Database 102 can include any type of system for storing data in volatile or non-volatile storage. This includes, but is not limited to, systems based upon magnetic, optical, and magneto-optical storage devices, as well as storage devices based on flash memory and/or battery-backed up memory.

Network 108 can generally include any type of wired or wireless communication channel capable of coupling together computing nodes. This includes, but is not limited to, a local area network, a wide area network, or a combination of networks. In one embodiment of the present invention, network 112 includes the Internet.

Client 110 can generally include any node on a network including computational capability and including a mechanism for communicating across the network.

Digital video feed server 106 and content server 104 can generally include any nodes on a network including a mechanism for servicing requests from a client for computational and/or data storage resources.

During operation, digital video feed server 106 transmits a digital video feed through network 108 to client 110. In one embodiment of the present invention, the digital video feed is an Internet Protocol Television (IPTV) video feed. In other embodiments, the digital video feed can include, but is not limited to: podcast video feeds, RSS video feeds, Atom video feeds, or any type of video feed which can be used to transmit a digital video feed and its corresponding content feed. Other embodiments of the present invention can include other network video streaming technology now known or later developed. Client 110 uses digital video player 114 within viewer 112 to view the digital video feed. If a user selects a moving object being displayed within digital video player 114, viewer 112 obtains content associated with the moving object and displays the content to the user.

For example, in one embodiment of the present invention, application 116 obtains the content associated with the moving object and displays the content to the user. In one embodiment of the present invention, application 116 is a web browser. In another embodiment of the present invention, application 116 is an Internet-enabled application on a cell phone. In another embodiment of the present invention, application 116 is a web browser embedded within another application.

In one embodiment of the present invention, the viewer 112 is the Quicken® financial software distributed by Intuit, Inc. of Mountain View, Calif., and application 116 is an embedded web browser within Quicken®. In other embodiments, viewer 112 can include any viewer that can play digital a video feed and its corresponding content feed, and can perform a specified action in response to user selections of moving objects within the digital video feed.

In one embodiment of the present invention, the moving object is a moving symbol for a tradable security within the digital video feed. If the moving symbol is selected by the user, viewer 112 causes a webpage for an investment broker to be displayed along with information about the tradable security corresponding to the moving symbol to enable the user to trade the tradable security. In one embodiment of the present invention, the tradable security is a stock and the moving symbol is a moving stock ticker symbol.

FIG. 2 presents a flow chart illustrating the process of interacting with a digital video feed in accordance with an embodiment of the present invention. The process begins when the system receives a digital video feed (step 202). In one embodiment of the present invention, the digital video feed includes a corresponding content feed, wherein the corresponding content feed is synchronized with the digital video feed. In this embodiment, the corresponding content feed contains information associated with moving objects within the digital video feed.

Next, the system plays the digital video feed and the synchronized content feed within a viewer (step 204) and allows a user to select a moving object being displayed within the viewer (step 206). In response to the selection, the system obtains content associated with the moving object (step 208). The system then displays the content to the user and/or modifies the digital feed and the synchronized content feed (step 210).

FIG. 3 presents a flow chart illustrating the process of creating an interactive digital video feed in accordance with an embodiment of the present invention. The system first identifies moving objects within the digital video feed (step 302). The system then embeds (or allows a user to embed) moving links to information associated with the moving objects on top of the moving objects within the digital video feed (step 304).

In one embodiment of the present invention, the system contains video data which is structured to facilitate interactions between a user and moving objects in a digital video feed. The video data includes: (1) a digital-video component which is configured to be transmitted as the digital video feed, and (2) a content component which is configured to be transmitted as a corresponding content feed. The video data is structured so that the digital-video feed is synchronized with the corresponding content feed when the digital-video feed and the corresponding content feed are transmitted, wherein the corresponding content feed contains content information associated with a moving object within the digital video feed. The content information for the moving object is structured to be retrieved in response to a user selection of the moving object in the digital video feed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating interactions with a digital video feed, comprising:
   receiving the digital video feed, which includes a corresponding content feed, wherein the corresponding content feed is synchronized with the digital video feed, and wherein the corresponding content feed contains information associated with moving objects within the digital video feed;
   playing the digital video feed within a viewer;
   allowing a user to select a moving object from the digital video feed being displayed within the viewer;
   in response to the selection,
      obtaining content associated with the moving object, and
      modifying the digital video feed and the corresponding content feed; and
   displaying the modified digital video feed and the corresponding content feed to the user.

2. The method of claim 1, wherein prior to receiving the digital video feed, the method further comprises creating the digital video feed by:
   identifying moving objects within the digital video feed; and
   embedding moving links to information associated with the moving objects on top of the moving objects within the digital video feed.

3. The method of claim 2, wherein after the digital video feed is created, the method further comprises sending the digital video feed, including the corresponding content feed, from a server to a client.

4. The method of claim 1, wherein the digital video feed is an Internet Protocol Television (IPTV) video feed.

5. The method of claim 1, wherein the moving object is a moving symbol for a tradable security within the digital video feed.

6. The method of claim 5, wherein if the moving symbol is selected by the user, the method further comprises causing a webpage for an investment broker to be displayed along with information about the tradable security corresponding to the moving symbol to enable the user to trade the tradable security.

7. The method of claim 6,
wherein the tradable security is a stock; and
wherein the moving symbol is a moving stock ticker symbol.

8. A non-transitory computer-readable storage medium storing instructions that when executed by a computer cause the computer to perform a method for facilitating interactions with a digital video feed, wherein the method comprises:
receiving the digital video feed, which includes a corresponding content feed, wherein the corresponding content feed is synchronized with the digital video feed, and wherein the corresponding content feed contains information associated with moving objects within the digital video feed;
playing the digital video feed within a viewer;
allowing a user to select a moving object from the digital video feed being displayed within the viewer;
in response to the selection,
obtaining content associated with the moving object, and
modifying the digital video feed and the corresponding content feed; and
displaying the modified digital video feed and the corresponding content feed to the user.

9. The non-transitory computer-readable storage medium of claim 8, wherein prior to receiving the digital video feed, the method further comprises creating the digital video feed by:
identifying moving objects within the digital video feed; and
embedding moving links to information associated with the moving objects on top of the moving objects within the digital video feed.

10. The non-transitory computer-readable storage medium of claim 9, wherein after the digital video feed is created, the method further comprises sending the digital video feed, including the corresponding content feed, from a server to a client.

11. The non-transitory computer-readable storage medium of claim 8, wherein the digital video feed is an Internet Protocol Television (IPTV) video feed.

12. The non-transitory computer-readable storage medium of claim 8, wherein the moving object is a moving symbol for a tradable security within the digital video feed.

13. The non-transitory computer-readable storage medium of claim 12, wherein if the moving symbol is selected by the user, the method further comprises causing a webpage for an investment broker to be displayed along with information about the tradable security corresponding to the moving symbol to enable the user to trade the tradable security.

14. The non-transitory computer-readable storage medium of claim 13,
wherein the tradable security is a stock; and
wherein the moving symbol is a moving stock ticker symbol.

15. An apparatus that facilitates interactions with a digital video feed, comprising:
a receiving mechanism configured to receive the digital video feed, which includes a corresponding content feed, wherein the corresponding content feed is synchronized with the digital video feed, and wherein the corresponding content feed contains information associated with moving objects within the digital video feed; and
a viewer, configured to:
play the digital video feed within a viewer;
allow a user to select a moving object from the digital video feed being displayed within the viewer;
in response to the selection,
obtain content associated with the moving object, and
modify the digital video feed and the corresponding content feed;
and to
display the modified digital video feed and the corresponding content feed to the user.

16. The apparatus of claim 15, further comprising:
a creation mechanism;
wherein prior to receiving the digital video feed, the creation mechanism is configured to create the digital video feed by:
identifying moving objects within the digital video feed; and
embedding moving links to information associated with the moving objects on top of the moving objects within the digital video feed.

17. The apparatus of claim 16, further comprising:
a transmission mechanism;
wherein after the digital video feed is created, the transmission mechanism is configured to send the digital video feed, including the corresponding content feed, from a server to a client.

18. The apparatus of claim 15, wherein the digital video feed is an Internet Protocol Television (IPTV) video feed.

19. The apparatus of claim 15, wherein the moving object is a moving symbol for a tradable security within the digital video feed.

20. A non-transitory computer-readable storage medium containing video data which is structured to facilitate interactions between a user and moving objects in a digital video feed, wherein the video data comprises:
a digital-video component which is configured to be transmitted as the digital video feed;
a content component which is configured to be transmitted as a corresponding content feed;
wherein the video data is structured so that the digital-video feed is synchronized with the corresponding content feed when the digital-video feed and the corresponding content feed are transmitted;
wherein the corresponding content feed contains content information associated with a moving object within the digital video feed;
wherein the content information for the moving object is structured to be retrieved in response to a user selection of the moving object in the digital video feed; and
wherein the digital video feed is structured to be modified in response to a user selection of the moving object in the digital video feed.

* * * * *